United States Patent [19]

Sheen

[11] Patent Number: 4,842,012
[45] Date of Patent: Jun. 27, 1989

[54] FAUCET VALVE STRUCTURE

[76] Inventor: Guang Y. Sheen, No.1-2, Lane 23, Yeong Chang Third St., Hsi Tun District, Taichung City, Taiwan

[21] Appl. No.: 164,274
[22] Filed: Mar. 4, 1988
[51] Int. Cl.$^4$ ................................................ F16K 3/26
[52] U.S. Cl. ................................ 137/454.2; 251/310; 251/345
[58] Field of Search ............... 137/454.2; 251/310, 251/344, 345

[56] References Cited

U.S. PATENT DOCUMENTS

| | | | |
|---|---|---|---|
| 3,426,795 | 2/1969 | Muller | 251/310 X |
| 3,472,486 | 10/1969 | Hastings | 251/345 |
| 4,603,837 | 8/1986 | Steer | 251/345 X |

FOREIGN PATENT DOCUMENTS 169148 3/1905 Fed. Rep. of Germany ...... 251/310

Primary Examiner—Robert G. Nilson
Attorney, Agent, or Firm—Seidel, Gonda, Lavorgna & Monaco

[57] ABSTRACT

A faucet valve to be used with a water knob to control the flow of faucet water. The faucet valve contains a valve body, a valve case, and an insert. A sealing cap is disposed to contact with the inner side of a hollow portion of the insert so that the flow of water can be controlled by the relative position of an outlet on the valve case with respect to the sealing cap. The faucet valve can be used with any type of water knob.

1 Claim, 4 Drawing Sheets

FAUCET VALVE STRUCTURE

BACKGROUND OF THE INVENTION

This invention relates to an improved faucet valve structure, and more specifically relates to an improved faucet valve which can be used with a water knob to control the flow of faucet water.

A prior art faucet valve is shown in FIG. 5, including a valve case 7, an insert 8, and a valve body 9. However, this kind of faucet valve has the following drawbacks:

1. The water knob used in the prior art has to be of a shape complementary to the top of the insert 8 in the center thereof. Moreover, there has to be a protrusion on the water knob to cooperate with an arched protrusion 72 in order to control the flow of water. In the case that the water knob has no such a protrusion, then it cannot be used with the prior art valve.

2. After some period of time, or after the water knob is forced too excessively, the protrusion of the water knob and the arched protrusion will more or less be damaged, so that the whole water faucent set will be loosened.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide an improved of faucet valve structure which can be utilized with any type of water knob.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
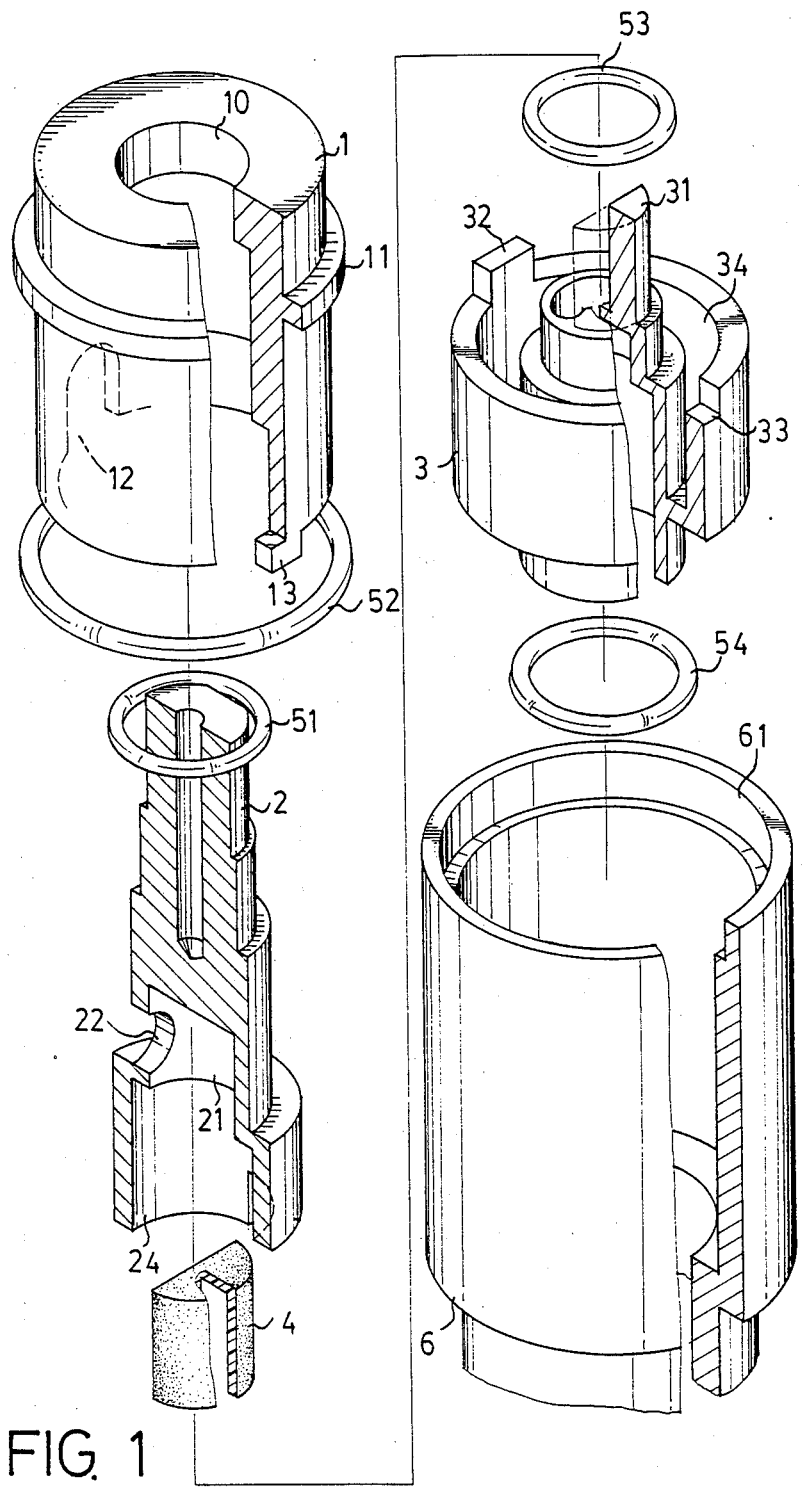
FIG. 1 is an exploded view of an improved faucet valve structure in accordance with the present invention.

Referring to FIG. 1, it is seen that there is a hole 10 disposed in the central axis of a valve case 1, where an insert 2 is located. An annular projection 11 is arranged at the periphery of a valve case 1, and an inverted U-shaped outlet 12 is located at the bottom of the same to be engaged with a protrusion 32 of the valve body 3. The protrusion 32 is shorter than the inverted U-shaped outlet 12 so that after the protrusion fits into the inverted U-shaped outlet, there is still enough room to let water flow therethrough. A projection 13 of the valve case 1 fits in a groove 33, thereby securing the valve case 1 and the valve body 3 together.

Figure 2:
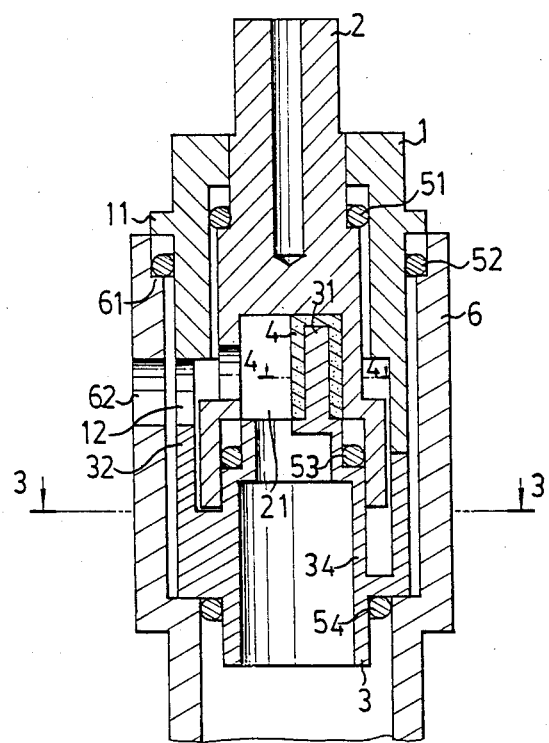
FIG. 2 is a sectional view of the improved faucet valve structure of FIG. 1.
Figure 4:
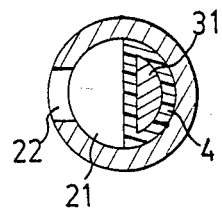
FIG. 4 is a cutaway view showing the relationship of a semi-circular rod and a sealing cap in accordance with the present invention.
Figure 5:
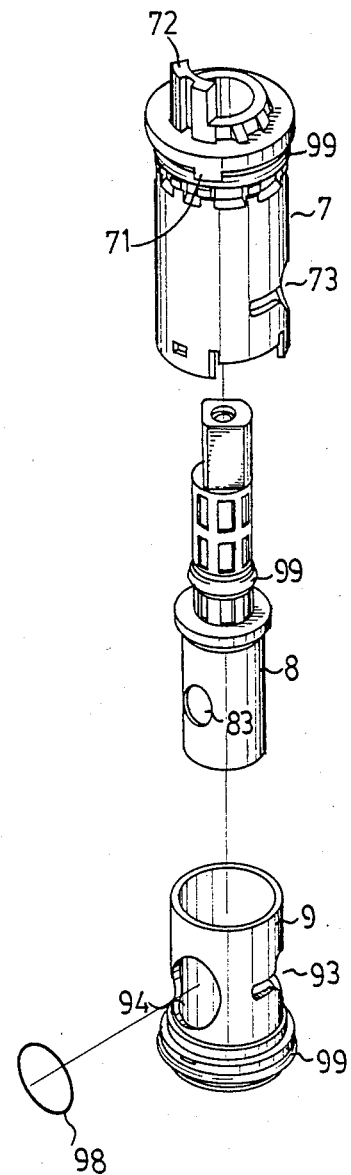
FIG. 5 is an exploded view of a prior art faucet valve.

There is a hollow portion 21 inside the insert 2, where an outlet 22 is disposed. An arched protrusion 24 is arranged at the bottom of the insert 2 and fits into an arched groove 34 of the valve body 3. A semi-circular rod 31 projecting from the top of the valve body 3 is encompassed by a sealing cap 4 (see FIG. 4). Assembling each of the parts in the aforesaid manner in addition to first, second, third and fourth seal rings 51, 52, 53, 54, respectively, will result in the present invention whose sectional view diagram is shown in FIG. 2.

Figure 3:
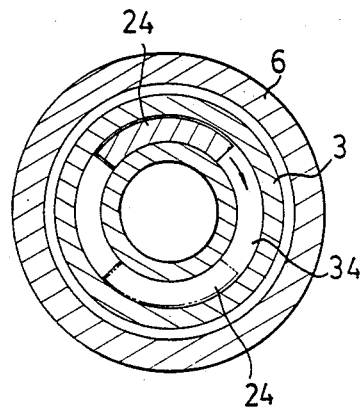
FIG. 3 is a cutaway view showing the relationship of an arched protrusion and an arched groove in accordance with the present invention.

The arched protrusion 24 is rotatable along the arched groove 34 for 180 degrees, as can be seen in FIG. 3. Thus, the flow of water can be controlled by the relative position of outlet 22 with respect to the sealing cap 4. Therefore, there is no need to arrange any other device on top of the valve case 1, and the water knob used with the valve to control the water can be of any ordinary type.

Further, the valve case 1 and the valve body 3 fit inside a faucet body 6 by means of the pressure of the seal rings 52, 54. Therefore, the whole water faucet set according to this invention is not likely to loosen unless the seal rings 52, 54 have been fatigued. Besides, if the force exerted on the water knob exceeds a certain level, then the valve rotates also so that the arched protrusion 24 and the arched groove 34 will not be damaged, thereby keeping the accuracy of controlling the flow of water.

In conclusion, this invention provides an improved faucet valve structure comprising an improvement of the insert 2 and the valve body 3, which can be utilized with any type of water knob. Therefore, the standardization and interchangeability of the parts of faucet are enhanced. Besides, there is no need to dispose special slots to fit the first, second, third and fourth seal rings 51, 52, 53, 54 so that it is simple to manufacture and more durable.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An improved faucet valve structure, comprising a valve case, an insert and a valve body, wherein a hole is disposed in a central axis of the valve case to receive the insert therein, characterized in that:

an annular projection is arranged at a periphery of said valve case, an inverted U-shaped outlet is located at a bottom of said valve case to permit an accommodation of a protrusion provided on said valve body, said inverted U-shaped outlet having enough room for water to flow therethrough; an arched protrusion is arranged at a bottom of said insert to fit into an arched groove of said valve body; a sealing cap is disposed to contact with an inner side of a hollow portion which is provided inside said insert, such that water flow is controllable by a relative position of said outlet with respect to said sealing cap.

* * * * *